United States Patent
Nguyen et al.

(10) Patent No.: US 9,407,546 B2
(45) Date of Patent: Aug. 2, 2016

(54) ROUTING A MESSAGE USING A ROUTING TABLE IN A DYNAMIC SERVICE MESH

(71) Applicant: Red Hat, Inc., Raleigh, NC (US)

(72) Inventors: Filip Nguyen, Brno (CZ); Filip Eliáš, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 165 days.

(21) Appl. No.: 14/188,380

(22) Filed: Feb. 24, 2014

(65) Prior Publication Data

US 2015/0244616 A1 Aug. 27, 2015

(51) Int. Cl.
| | | |
|---|---|---|
| G06F 15/173 | (2006.01) | |
| H04L 12/721 | (2013.01) | |
| H04L 12/733 | (2013.01) | |
| H04L 12/751 | (2013.01) | |
| H04L 12/703 | (2013.01) | |

(52) U.S. Cl.
CPC ............... *H04L 45/70* (2013.01); *H04L 45/20* (2013.01); *H04L 45/02* (2013.01); *H04L 45/28* (2013.01)

(58) Field of Classification Search
CPC ......... H04L 45/70; H04L 45/20; H04L 45/02; H04L 45/28
USPC ........................................ 709/238, 242, 243
See application file for complete search history.

(56) References Cited

U.S. PATENT DOCUMENTS

| | | | |
|---|---|---|---|
| 7,814,226 B2 | 10/2010 | Patrick | |
| 8,306,979 B2 | 11/2012 | Mao | |
| 8,433,782 B2 | 4/2013 | Phukan | |
| 2006/0215582 A1* | 9/2006 | Castagnoli | H04L 45/02 370/254 |
| 2009/0319686 A1 | 12/2009 | Watanabe | |
| 2010/0061385 A1* | 3/2010 | Welin | H04L 29/12028 370/401 |
| 2010/0241716 A1* | 9/2010 | Akadiri | H04L 69/08 709/206 |
| 2011/0194472 A1* | 8/2011 | Bahr | H04L 45/00 370/311 |
| 2013/0128757 A1* | 5/2013 | Chowdhary | H04W 24/00 370/252 |

FOREIGN PATENT DOCUMENTS

WO    WO 2010076261    7/2010

OTHER PUBLICATIONS

Silvio Kohler, Complex Event Detection on an Enterprise Service Bus; Master Thesis, ETH Zurich, retrieved on Apr. 17, 2014 from http://e-collection.library.ethz.ch/eserv/eth:41547/eth-41547-01.pdf, pp. 1-76.

(Continued)

*Primary Examiner* — Mohamed Wasel
(74) *Attorney, Agent, or Firm* — Haynes and Boone, LLP

(57) ABSTRACT

An example method for routing a message in a dynamic service mesh includes receiving at a mesh point a first message from a sender service and determining, based on a routing table, whether the mesh point has previously received a second message from the sender service. When the mesh point is determined to not have received the second message from the sender service, the first message is routed to a target service in the dynamic service mesh. The method includes receiving an indication of whether the first message has been accepted by the target service and updating the routing table based on the indication. When the indication indicates that the first message has been rejected by the target service, the first message is routed from the mesh point to a second target service.

20 Claims, 5 Drawing Sheets

(56) References Cited

OTHER PUBLICATIONS

Carla Sadtler et al., Patterns SOA Foundation Service Connectivity Scenario, Aug. 2006, retrieved on Apr. 17, 2014 from http://www.redbooks.ibm.com/redbooks/pdfs/sg247228.pdf, pp. 1-750, IBM WebSphere Software.

Sam Gentile, Enterprise Service Buses (ESBs) Drive SOA Adoption Part 6—The ESB Channel Model; retrieved on Apr. 17, 2014 from http://samgentile.net/Web/neuron-esb/enterprise-service-buses-esbs-drive-soa-adoption-part-6-the-esb-channel-model/, pp. 1-6.

Abu Dhabi, Layer 5 Integration; IT Architecture & Standards, 32 pages.

Nick Barendregt, Load Balancing in ESB Based Service Platform, Universiteit Van Amsterdam, Research Project 2, Sep. 4, 2012, 29 pages.

\* cited by examiner

ROUTING A MESSAGE USING A ROUTING TABLE IN A DYNAMIC SERVICE MESH

BACKGROUND

The present disclosure generally relates to a service mesh, and more particularly to routing messages in a dynamic service mesh.

Service Oriented Architecture (SOA) is a popular architectural paradigm for the development of software applications. For example, Web services provide the SOA to other applications via industry standard networks, interfaces, and protocols. The SOA is based on loosely-coupled and standards-based architectures. It is an approach to distributed computing that allows networked software resources to be leveraged. The SOA enables enterprises to integrate services, handle business events, and automate business processes more efficiently. For example, an SOA links information technology resources, data, services, and applications.

The SOA can include an enterprise service bus (ESB). An ESB is an underlying infrastructure for the SOA and implements the abstract design concept of the SOA. An ESB is a distributed middleware system for integrating Information Technology (IT) assets. The messaging bus in the ESB connects services together. An ESB may be an event-driven and standards-based messaging engine that provides services for complex architectures. The ESB provides infrastructure that links together services and clients to enable distributed applications and processes. The ESB provides the capabilities of message handling, filtering, data transformation, content-based routing, and message repositories. The ESB typically provides a service to a client using a service deployed on an ESB server at runtime. The ESB allows systems to interact through standard transports, such as file transfer protocol (FTP) and hypertext transfer protocol (HTTP), and to provide SOA-based applications.

The ESB may be used for client-server interactions and may provide infrastructure that links together services and clients to enable distributed applications and processes. The ESB may include one or more messaging busses that logically interconnect available services and clients. For example, the ESB may provide a service to the client using a service deployed on an ESB server at runtime. In an example, the ESB is deployed to an application server and then services are deployed to the ESB.

These architectures may be scaled by introducing more services into the SOA. It is harder, however, to handle orchestration between a large number of services. Today, some existing SOA design patterns try to solve the problem of scaling these architectures. For example, a content based router enables routing of messages to the correct destination based on the contents of the message exchanges. In another example, a static router enables routing of messages through a manually-configured routing entry. These solutions, however, fall short in large scale environments. As cloud computing grows, such demands for orchestration between large amounts of services becomes increasingly important.

BRIEF SUMMARY

Methods, systems, and techniques for routing a message in a dynamic service mesh are provided.

According to an embodiment, a system for routing a message in a dynamic service mesh including a plurality of services includes a communications interface that receives a first message from a sender service and receives an indication of whether the first message has been accepted by a target service. The first message includes a sender service identifier that identifies a sender service. The system also includes a routing engine that determines, based on a routing table, whether a mesh point has received a second message from the sender service and updates the routing table based on the indication. The second message is received before the first message and the mesh point is a node that routes one or more messages in a dynamic service mesh including a plurality of services. When the mesh point is determined to not have received the second message from the sender service, the routing engine routes the first message to the target service of the plurality of services. When the indication indicates that the first message has been rejected by the target service, the routing engine routes the first message from the mesh point to a second target service of the plurality of services, inserts into the routing table an entry indicating that the target service rejected the first message, and increments a fail count for the first message.

According to another embodiment, a method of routing a message in a dynamic service mesh including a plurality of services includes receiving at a mesh point a first message from a sender service. The first message includes a sender service identifier that identifies a sender service, and the mesh point is a node that routes one or more messages in a dynamic service mesh including a plurality of services. The method also includes determining, based on a routing table, whether the mesh point has received a second message from the sender service. The second message is received before the first message. The method further includes when the mesh point is determined to not have received the second message from the sender service, routing the first message to a target service of the plurality of services. The method also includes receiving an indication of whether the first message has been accepted by the target service. The method further includes updating the routing table based on the indication. The method also includes when the indication indicates that the first message has been rejected by the target service, routing the first message from the mesh point to a second target service of the plurality of services, where updating the routing table includes inserting into the routing table an entry indicating that the target service rejected the first message and incrementing a fail count for the first message.

According to another embodiment, a non-transitory machine-readable medium includes a plurality of machine-readable instructions that when executed by one or more processors are adapted to cause the one or more processors to perform a method including: receiving at a mesh point a first message from a sender service, the first message including a sender service identifier that identifies a sender service, and the mesh point being a node that routes one or more messages in a dynamic service mesh including a plurality of services; determining, based on a routing table, whether the mesh point has received a second message from the sender service, the second message being received before the first message; when the mesh point is determined to not have received the second message from the sender service, routing the first message to a target service of the plurality of services; receiving an indication of whether the first message has been accepted by the target service; updating the routing table based on the indication; and when the indication indicates that the first message has been rejected by the target service, routing the first message from the mesh point to a second target service of the plurality of services, where updating the routing table includes inserting into the routing table an entry indicating that the target service rejected the first message and incrementing a fail count for the first message.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
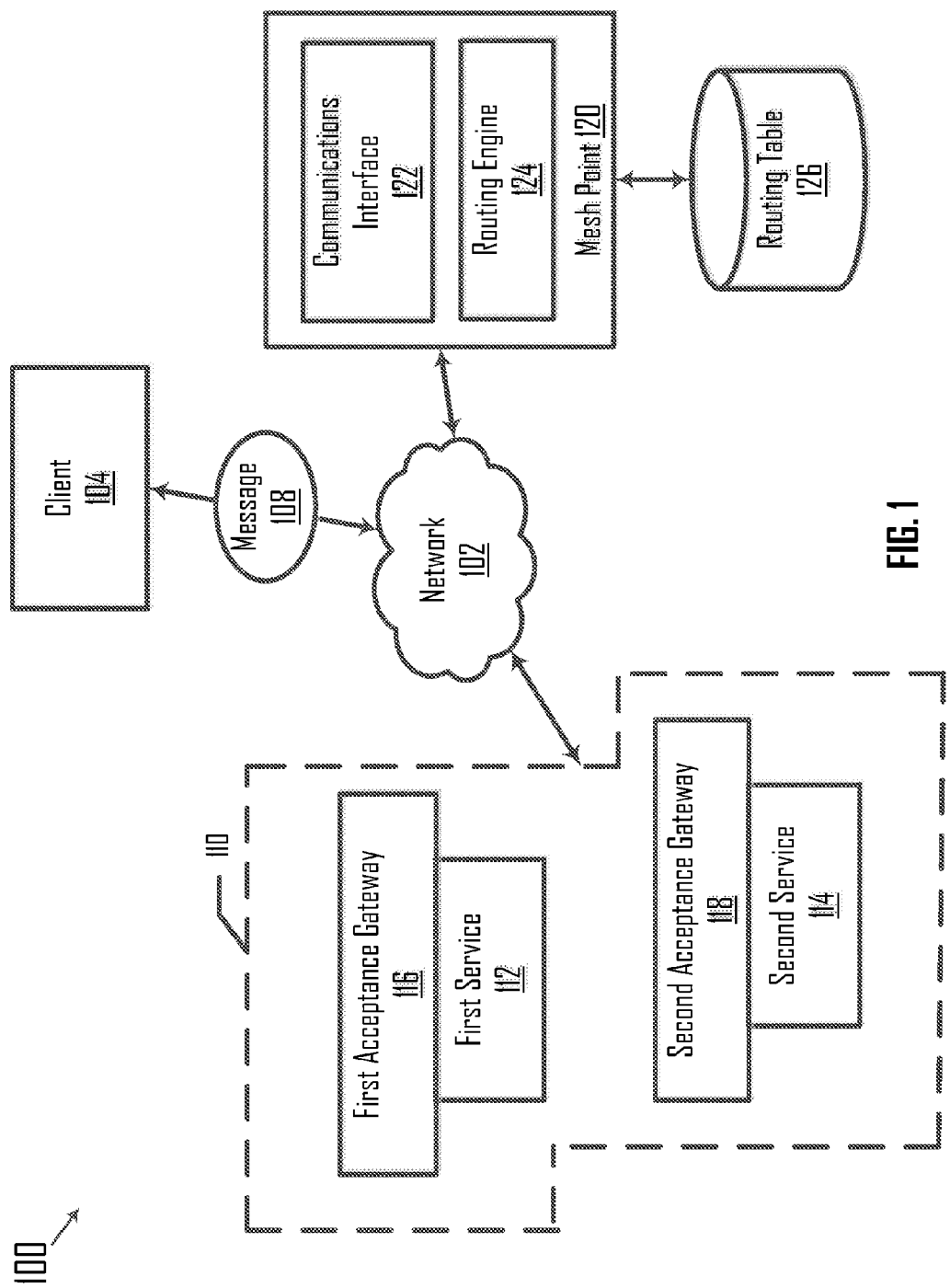
FIG. 1 is a block diagram illustrating a system for routing a message in a dynamic service mesh, according to an embodiment.

Embodiments of the present disclosure and their advantages are best understood by referring to the detailed description that follows.

DETAILED DESCRIPTION

I. Overview
II. Example System Architecture
III. Example ESB Architecture with Mesh Points
   A. Mesh Points and Services
   B. Acceptance Gateways
   C. Message Routing in a Dynamic Service Mesh
     1. Routing Table is Empty
     2. Routing Table is Not Empty
IV. Example Method
V. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

An action may refer to a small building block of an ESB and may be, for example, a simple enrichment to a message (e.g., adding a field to a message or concatenation of a first name and a second name) or sending a message to a statically-defined destination (e.g., via a static router). A developer may group actions into an action pipeline, which includes a list of actions that sequentially take place one after another.

In a conventional action pipeline, the execution of services residing in the ESB is typically sequential according to their position in the action pipeline. In such a conventional action pipeline, a service is a building block that is associated with exactly one action pipeline. The service, in addition to the action pipeline, may be identified by name and accessed by external clients (e.g., via web services or via Java Messaging Service (JMS®). Trademarks are the property of their respective owners. Each service has an input and output queue that is used for communication and holds messages. In an example, a queue may be a JMS® queue. A service fetches messages from its input queue, processes the messages, and places the outputs of the messages into the output queue. Accordingly, messages may flow through the action pipeline and end up in a service's output queue.

When one service that is connected to the messaging bus is slow in execution, the whole ESB service may be slowed down. Accordingly, the processing of messages may be delayed. If the first service is significantly faster than the second service, it may be desirable to integrate another second service into the pipeline so that it does not act as a bottleneck. When adding new services to increase performance and to extend the system, which may be an important aspect in integration work, a developer may also consider reconfiguring load balancers or may manually create rules to load balance between new and old services of the same type. In the case of implementing complicated multi-step pipelines such as decryption of a message, enrichment of the message, and sending the message to a web service, the developer may put in even more effort. As the number of services added to the ESB grows, however, it may be more difficult to reprogram the pipeline.

The present disclosure provides a dynamic service mesh that may be used to integrate services into or remove services from the SOA. The disclosure provides techniques to horizontally scale an SOA automatically and may be used in practice as a brute force solution. The dynamic service mesh may be an integration solution that enables new entities (e.g., services) to be added to or removed from standard ESB implementations.

II. Example System Architecture

FIG. 1 is a block diagram illustrating a system 100 for routing a message in a dynamic service mesh, according to an embodiment. System 100 may include an SOA (an information system architecture that organizes and uses distributed capabilities (services) for one or more applications). An SOA provides a uniform mechanism to offer, discover, interact with and use capabilities (services) distributed over a network 102. Through the SOA, an application may be designed that combines loosely coupled and interoperable services.

In an embodiment, system 100 includes an ESB. An ESB is an event-driven and standards-based messaging engine that provides services for more complex architectures. The ESB provides an infrastructure that links together services and clients to enable distributed applications and processes. The ESB may be implemented to facilitate an SOA. The ESB may be a single bus that logically interconnects all available services and clients. Alternatively, the ESB may include multiple busses, each of which may logically interconnect different services and/or clients.

System 100 includes one or more clients 104, a dynamic service mesh 110 including a plurality of services, and one or more mesh points 120 coupled over network 102. Network 102 may be a private network (e.g., local area network (LAN), wide area network (WAN), intranet, etc.), a public network (e.g., the Internet), or a combination thereof. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Client 104 may be a personal computer (PC), workstation, mobile device (e.g., a mobile phone, personal digital assistant (PDA), tablet, and laptop), game console, set-top box, kiosk, embedded system, or other device having at least one processor and memory. Client 104 may also be an application run on a PC, server, database, etc. In the SOA, client 104 includes an application that accesses services. Client 104 may be a fat client (e.g., a client that performs local processing and data storage), a thin client (e.g., a client that performs minimal or no local processing and minimal to no data storage), and/or a hybrid client (e.g., a client that performs local processing but little to no data storage).

Client 104 may send a message 108 to a mesh point 120 that is coupled over network 102. Mesh points are computing nodes that include at least one processor and memory and are used to mediate between services. A mesh point may receive one or more messages from one or more services and route one or more messages through dynamic service mesh 110. In FIG. 1, mesh point 120 includes a communications interface 122 and a routing engine 124. In an embodiment, mesh point 120 receives at communications interface 122 message 108 from client 104.

Mesh point 120 receives message 108 and determines to which service to route message 108. Mesh point 120 may route the message to any service in dynamic service mesh 110. Dynamic service mesh 110 includes a first service 112 and a second service 114. A server may host services (e.g., first service 112 and/or second service 114), applications, and/or other functionality that is available to client 104 on system 100. The server may be a single machine or may include multiple interconnected machines (e.g., machines configured in a cluster). Although dynamic service mesh 110 is illustrated as including two services, it should be understood that dynamic service mesh 110 may include two or more services. Further, services may be added to or removed from dynamic service mesh 110, and messages may be randomly routed through dynamic service mesh 110 in an automated fashion and processed by one or more services.

Each service may be coupled to a service gateway (not shown), which is an input of the service. The service gateway may be prepended with an acceptance gateway, which determines whether the particular service is capable of processing the message. For simplicity, an acceptance gateway may be illustrated and described as being prepended to a service. Each service may be coupled to an acceptance gateway that inspects messages before they are sent to the respective service. In FIG. 1, first service 112 is coupled to a first acceptance gateway 116, and second service 114 is coupled to a second acceptance gateway 118. An acceptance gateway determines whether the particular service can process the message. If the acceptance gateway determines that the service can process the message, the acceptance gateway passes the message along to the service for processing and may send an indication to mesh point 120 that message 108 has been accepted by the particular service. If, however, the acceptance gateway determines that the service cannot process the message, the acceptance gateway may send an indication to mesh point 120 that message 108 has been rejected by the particular service. In an example, the acceptance gateway sends the indication by sending message 108 back to mesh point 120.

Mesh point 120 is coupled to a routing table 126, which stores routing data for mesh point 120 to consider in determining where to route messages. Accordingly, the routes of messages are not hardcoded, and a mesh point learns to which service(s) to route messages. Routing table 126 may store data on messages received from sender services, the previous routing of messages such as to which service(s) in dynamic service mesh 110 mesh point 120 has routed messages, and which services accepted or rejected the messages.

In an example, second service 114 is incapable of processing message 108, and first service 112 is capable of processing message 108 and must do so before it is processed by second service 114. In such an example, first service 112 may process message 108 and the output of the processed message is sent to second service 114 for processing. When communications interface 122 receives message 108, routing engine 124 may select a target service in dynamic service mesh 110 to which to send message 108. A target service may refer to a service to which a message is sent. Routing engine 124 may select the target service by accessing routing table 126 to determine where routing engine 124 has previously routed messages received from client 104 and which services have accepted and/or rejected the messages. If routing table 126 is empty, routing engine 124 may randomly select a target service in dynamic service mesh 110 to which to send message 108. Routing engine 124 may randomly select a target service in a variety of ways. For example, routing engine 124 may maintain an array "targetServices" with indices (e.g., targetService[0]="first service 112", targetService[1]="second service 114", etc.) and randomly generate a number between zero and the length of the array minus one. The particular service at the index corresponding to the generated number may be the target service that is selected. Other techniques may be used to randomly select the target service.

Routing engine 124 may randomly select second service 114 and route message 108 to second service 114, which is prepended by second acceptance gateway 118. Second acceptance gateway 118 may determine whether second service 114 is capable of processing message 108 and send an indication to mesh point 120 of whether message 108 has been accepted or rejected by second service 114. Routing engine 124 may update routing table 126 based on the indication of whether message 108 has been accepted or rejected by second service 114. In an example, routing table 126 includes columns "Sender Service", "Target Service", "Success", and "Fail". A sender service may refer to a service from which a message was sent. The message may include a sender service identifier that identifies the sender service. A target service may refer to a service to which the message was routed. The success column may be a count of the number of messages the target service has accepted from the corresponding sender service identified in the row, and the fail column may be a count of the number of messages the target service has rejected from the corresponding sender service identified in the row.

In an example, when the indication indicates that message 108 has been accepted by second service 114, routing engine 124 inserts into routing table 126 an entry indicating that second service 114 accepted message 108 and increments a success count for the message. Table A below provides an example of the data stored in routing table 126 after routing engine 124 receives an indication that message 108 has been accepted by second service 114.

TABLE A

| Sender Service | Target Service | Success | Fail |
|---|---|---|---|
| Client 104 | Second service 114 | 1 | 0 |

After second service 114 is finished processing message 108, second service 114 may send the output of the processed message to another mesh point (not shown), which determines to which service to route the received message.

In another example, when the indication indicates that message 108 has been rejected by second service 114, routing engine 124 inserts into routing table 126 an entry indicating that second service 114 rejected message 108 and increments a fail count for the message. Table B below provides an example of the data stored in routing table 126 after routing engine 124 receives an indication that message 108 has been rejected by second service 114.

TABLE B

| Sender Service | Target Service | Success | Fail |
|---|---|---|---|
| Client 104 | Second service 114 | 0 | 1 |

When the indication indicates that message 108 has been rejected by second service 114, routing engine 124 may route message 108 to a second target service in dynamic service mesh 110. Routing engine 124 may randomly select the second target service. In an example, routing engine 124 randomly selects first service 112 as the second target service. In keeping with the above example, first service 112 is capable of processing message 108. First acceptance gateway 116 may determine that first service 112 is capable of processing message 108 and send an indication to mesh point 120 that first service 112 is capable of processing message 108. Table C below provides an example of the data stored in routing table 126 after routing engine 124 receives an indication that message 108 has been rejected by second service 114 and accepted by first service 112.

TABLE C

| Sender Service | Target Service | Success | Fail |
|---|---|---|---|
| Client 104 | Second service 114 | 0 | 1 |
| Client 104 | First service 112 | 1 | 0 |

Mesh point 120 may continue to build its routing table and determine where to route messages based on data stored in routing table 126. For example, based on the example of routing table 126 illustrated in Table A and Table C, routing engine 124 may send the next message received from client 104 to second service 114 because it has already accepted a message from client 104. In another example, based on the example of routing table 126 illustrated in Table B, routing engine 124 may randomly select another service to which to send a received message. Routing engine 124 may implement more complicated routines to determine to which services to route messages. An advantage of an embodiment of the invention may enable a developer to easily integrate services into the dynamic service mesh without complications from reprogramming the action pipeline because the routing tables store updated data on which services accept and/or reject messages.

III. Example Esb Architecture with Mesh Points

Figure 2:
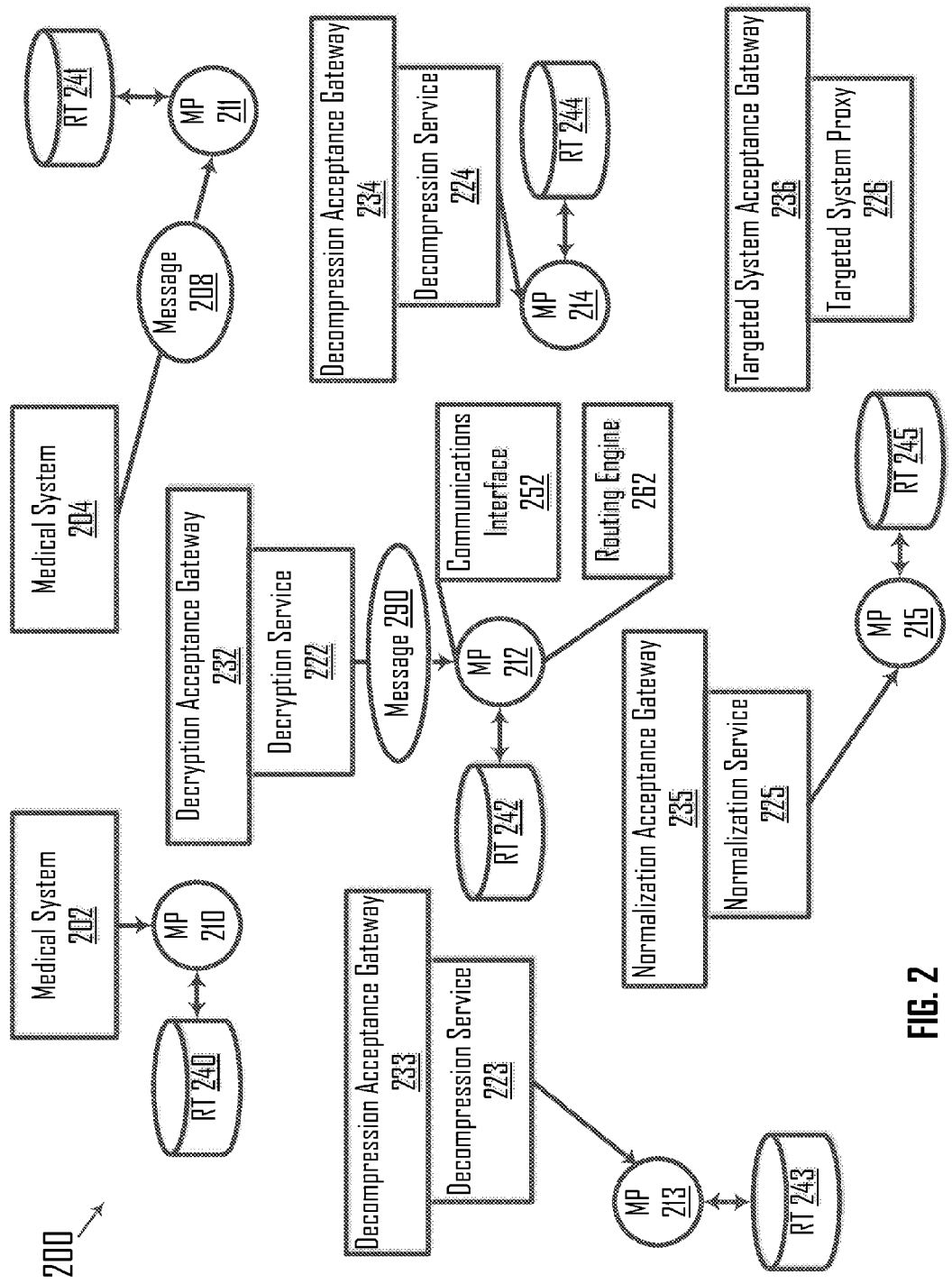
FIG. 2 is a block diagram illustrating an architecture of an ESB with mesh points, according to an embodiment.

FIG. 2 is a block diagram 200 illustrating an architecture of an ESB with mesh points, according to an embodiment. Diagram 200 includes medical systems 202 and 204 that produce encrypted medical data and use the same encryption algorithm. Before encrypting the medical data, medical systems 202 and 204 may produce medical scans and compress them using the same compression algorithm. In an example, medical systems 202 and 204 provide encrypted and compressed medical scans of patients but may be incompatible with each other. For example, medical system 202 may use a different messaging format than medical system 202, and medical system 204 may add a time attribute to its medical scans. It may be desirable to pass messages between medical systems 202 and 204. In an example, to pass an encrypted and compressed message from medical system 204 to targeted system proxy 226, which is a component in medical system 202, the message is decrypted, decompressed, and then normalized into a common format (e.g., the time attribute added by medical system 204 is removed).

A. Mesh Points and Services

Diagram 200 includes a plurality of mesh points 210-215 and a plurality of services, decryption service 222, decompression services 223 and 224, and normalization service 225. It should be understood that the example illustrated in FIG. 2 includes a small number of services. In typical integration solutions, hundreds of services may be included in the dynamic service mesh. Each mesh point may include a communications interface and a routing engine (not shown). In an embodiment, a mesh point receives inputs (e.g., a message) from exactly one sender service. For example, mesh point 210 takes inputs from medical system 202, mesh point 211 takes inputs from medical system 204, mesh point 212 takes inputs from decryption service 222, mesh point 213 takes inputs from decompression service 223, mesh point 214 takes inputs from decompression service 224, and mesh point 215 takes inputs from normalization service 225. In another embodiment, a mesh point receives inputs from a plurality of services. The connection to a concrete mesh point may to some degree be given by geographical restrictions or by architectural decisions.

After a service is finished processing a message, the service may send an output of the processed message to the appropriate mesh point. For example, after decryption service 222 is finished decrypting a message, decryption service 222 sends the decrypted message to mesh point 212, which determines where to route the decrypted message. Similarly, after decompression service 223 is finished decompressing a message, decompression service 223 sends the decompressed message to mesh point 213, which determines where to route the decompressed message. Similarly, after decompression service 224 is finished decompressing a message, decompression service 224 sends the decompressed message to mesh point 214, which determines where to route the decompressed message. Similarly, after normalization service 225 is finished normalizing a message, normalization service 225 sends the normalized message to mesh point 215, which determines where to route the normalized message.

Mesh points may work was independently as possible. For example, each mesh point may maintain its own routing table and be capable of routing messages to any service. In FIG. 1, mesh point 210 is coupled to routing table 240, mesh point 211 is coupled to routing table 241, mesh point 212 is coupled to routing table 242, mesh point 213 is coupled to routing table 243, mesh point 214 is coupled to routing table 244, and mesh point 215 is coupled to routing table 245.

B. Acceptance Gateways

In FIG. 1, each service has its own implementation of an acceptance gateway. Decryption acceptance gateway 232 prepends decryption service 222 and determines whether it is capable of processing a message. Decryption acceptance gateway 232 may determine whether decryption service 222 is capable of processing the message in a variety of ways. In an example, decryption acceptance gateway 232 determines whether the message is encrypted by examining metadata of the message. An acceptance gateway may run the whole action pipeline and after that declare whether the invocation was successful. In an example, decryption acceptance gateway 232 implements a decryption routine on the message and tests whether the decryption finished without errors and produced a meaningful message. If decryption service 222 is capable of processing the message, decryption acceptance gateway 232 accepts the message, passes it along to decryption service 222 for processing, and sends the mesh point that sent the message an indication that decryption service 222 has accepted the message. If, however, decryption service 222 is not capable of processing the message, decryption acceptance gateway 232 rejects the message and sends the mesh point that sent the message an indication that decryption service 222 has rejected the message.

Decompression acceptance gateway 233 prepends decompression service 223 and determines whether it is capable of processing a message. Decompression acceptance gateway 234 prepends decompression service 224 and determines whether it is capable of processing a message. Decompression acceptance gateway 233, 234 may determine whether decompression service 223, 224 is capable of processing the message in a variety of ways. In an example, decompression acceptance gateway 233, 234 determines whether the message is compressed by examining metadata of the message. In another example, decompression acceptance gateway 233, 234 implements a decompression routine on the message and tests whether the decompression finished without errors and produced a meaningful message. If decompression service 223, 224 is capable of processing the message, decompression acceptance gateway 233, 234 accepts the message, passes it along to decompression service 223, 224 for processing, and sends the mesh point that sent the message an indication that decompression service 223, 224 has accepted the message. If, however, decompression service 223, 224 is not capable of processing the message, decompression acceptance gateway 233, 234 rejects the message and sends the mesh point that sent the message an indication that decompression service 223, 224 has rejected the message.

Normalization acceptance gateway 235 prepends normalization service 225 and determines whether it is capable of processing a message. Normalization acceptance gateway 235 may determine whether normalization service 225 is capable of processing the message in a variety of ways. In keeping with the above example, normalization acceptance gateway 235 may inspect the message, which includes a binary encoded medical scan and metadata. The metadata may be represented by an Extensible Markup Language (XML) document, which includes the following: <deviceID>3343F</deviceID> . . . <scanResolution>xxxx</scanResolution>. Normalization acceptance gateway 235 may scan the message and determine whether the XML document is a valid XML file and/or whether the message complies with the metadata format. If the XML document is a valid XML file and/or the message complies with the metadata format, normalization acceptance gateway 235 determines that normalization service 225 is capable of processing the message, passes it along to normalization service 225, and sends the mesh point that sent the message an indication that normalization service 225 has accepted the message. If, however, the XML document is not a valid XML file and/or the message does not comply with the metadata format, normalization acceptance gateway 235 determines that normalization service 225 is not capable of processing the message, rejects the message, and sends the mesh point that sent the message an indication that normalization service 225 has rejected the message.

In an example, an acceptance gateway is a generic acceptance gateway that recognizes, for example, a parseable XML message, a Simple Object Access Protocol (SOAP) message, or a JavaScript Object Notation (JSON) message. The generic acceptance gateway may be reconfigured to accept only a subset of such messages (e.g., only XML messages that contain root element <order>). Targeted system acceptance gateway 236 prepends targeted system proxy 226 and determines whether it is capable of processing a message.

C. Message Routing in a Dynamic Service Mesh

In an example, compressed and encrypted message 208 from medical system 204 starts its route at mesh point 211, which may be trained to know which services are capable of accepting the message. In an example, mesh point 211 has already filled its routing table and has been trained to know to send message 208 to decryption service 222 so that the message can be decrypted. In keeping with the above example of the appropriate order in which to process the message (e.g., decrypt, decompress, and then normalize the message), decryption acceptance gateway 232 may receive, accept, and pass encrypted and compressed message 208 along to decryption service 222 to decrypt. Decryption service 222 may process message 208 by decrypting the message and then route a decrypted and compressed message 290 to mesh point 212.

The following is a description of mesh point 212. This description applies as well to other mesh points. Mesh point 212 may include a communications interface 252 and a routing engine 262. Mesh point 212 may receive via communications interface 252 a decrypted and compressed message that includes a sender service field and a state field. The sender service field stores a sender service identifier that identifies a sender service of the message. The mesh point that receives the message may remember from which service the message originated. In an example, if mesh point 213 receives a message from mesh point 212, decryption service 222 may be included in the message as the sender service. The state in the state field is a state of the message and may be an arbitrary string. A service that receives and processes a message may alter a state of the message and may assign different states. In an example, a decryption service may add a unique state "decrypted" to a message that the decryption service processes. In another example, the decryption service may add a unique state "partially decrypted" to a message that the decryption services processes in the case that the message has been encrypted more than once.

Table D below provides an example of message 290 that decryption service 222 sends to mesh point 212.

TABLE D

| Sender Service: Decryption Service 222 |
| State: Decrypted |
| ... |

Routing engine 262 may examine message 290 and access routing table 242 to select a target service to which to route the message. After routing engine 262 sends the message to the target service, routing engine 262 communicates with the acceptance gateway of the target service and modifies routing table 242 based on whether the target service accepted or rejected the message.

In an embodiment, routing engine 262 may determine, based on routing table 242, whether mesh point 212 has previously received any messages from the sender service indicated in the message. When mesh point 212 is determined to not have received any messages from the sender service, routing table 242 does not store routing data of use to routing engine 262 to select the target service, and routing engine 124 may route the message to a randomly selected target service of a plurality of services in the dynamic service mesh. Routing engine 262 may receive an indication of whether the message has been accepted by the target service and update routing table 242 based on the indication.

When the indication indicates that the message has been accepted by the target service, routing engine 262 may update routing table 242 by inserting into routing table 242 an entry indicating that the target service accepted the message and increment a success count for the message. When the indication indicates that the message has been rejected by the target service, routing engine 124 may update routing table 242 by inserting into routing table 242 an entry indicating that the target service rejected the message and increment a fail count for the message and may also route the message from mesh point 212 to a second randomly selected target service of the plurality of services in the dynamic service mesh. When mesh point 212 is determined to have received one or more messages from the sender service, routing table 242 may store routing data that is of use to routing engine 262 to select the target service.

Routing tables may enable a developer to scale the system by adding another service (e.g., decompression service) to or removing a service from the system. When the developer wants to scale the system, it may be unnecessary for the developer to connect the added decompression service in a complicated way (e.g., adding the decompression service to the action pipeline or adding the routing to a static router). Rather, the developer may prepend a decompression acceptance gateway to the new decompression service and add the new decompression service to the dynamic service mesh.

In an embodiment, one or more routing engines selects the target service by implementing the routine in Table E.

TABLE E

Input: Message (M), Routing Table (RT)
Output: Service (S), Modified Routing Table (RT)
ROUTINE:
1. candidateRows = select rows from RT that has M.SenderService and M.state
2. var P = associative array   // Key is a service
3. for each row in candidateRows
4.     P[row.'TargetService'] = row.SuccessCount − row.FailCount
5. min := minimum of all values in P or zero if P is empty
6. min += 1
7. increment all values in P by min
8. sum := sum all values in P
9. rand := random number from 1 to 100
10. if (rand <=10 || RT is empty)
11.     send message to random service
12.     if acceptance gateway accepts
13.         increment success count for this message in RT
14.     else
15.         increment fail count for this message in RT
16. else
17.     let S be any service, with probability P [S]/sum send the message to S In an example, routing engine 262 implements the routine illustrated in Table E. As illustrated in Table E, routing engine 262 may take a message "M" and a routing table 242 "RT" as an input and output a target service "S" and a modified routing table 242 "RT". In an example, routing table 242 includes columns "Sender Service", "State", "Target Service", "Success", and "Fail". In an example, communications interface 252 may receive decrypted and compressed message 290 (see Table D).

I. Routing Table is Empty

In an example, routing table 242 is empty and mesh point 212 has not yet learned which services are capable of processing the messages that mesh point 212 receives. As illustrated at lines 1-4 of Table E, routing engine 262 selects from routing table 242 one or more candidate rows including a sender service and state of the received message and creates an associative array "P". For each target service in a candidate row, the associative array stores a difference between the success count and fail count of the particular sender service. In such an example, candidateRows=0 and associative array P is empty.

As illustrated at lines 5-8 of Table E, routing engine 262 determines a min variable of all values in associative array P or determines that min is 0 if P is empty. Routing engine 262 then increments the min variable by one, increments all values in the associated array P by the min variable, and determines a sum equal to all values in the associative array P. In keeping with the above example that associative array P is empty, routing engine 262 determines that min=0 and increments min by one such that min=1.

As illustrated at lines 9-17 of Table E, a random number between 1 and 100 is generated. If the randomly generated number is less than or equal to 10 or if routing table 242 is empty, routing engine 262 sends message 290 to a randomly selected target service. In such an example, a message may be sent to a randomly selected target service ninety percent of the time. If the acceptance gateway prepended to the target service accepts the message, routing engine 262 increments the success count for the message in routing table 242. If the acceptance gateway prepended to the target service rejects the message, routing engine 262 increments the fail count for the message in routing table 242. If the randomly generated number is not less than or equal to 10 and routing table 242 is not empty, routing engine 262 may calculate a probability for each of the sender services in the associated array P to determine which sender service to send the message. In an example, routing engine 262 randomly generates a number and determines whether the random number satisfies a threshold. When the random number satisfies the threshold or when routing table 242 is empty, routing engine 262 randomly selects the target service and routes message 290 to the randomly selected target service. Routing engine 262 may update routing table 2452 based on whether the target service accepted or rejected message 290.

2. Routing Table is Not Empty

Figure 3:
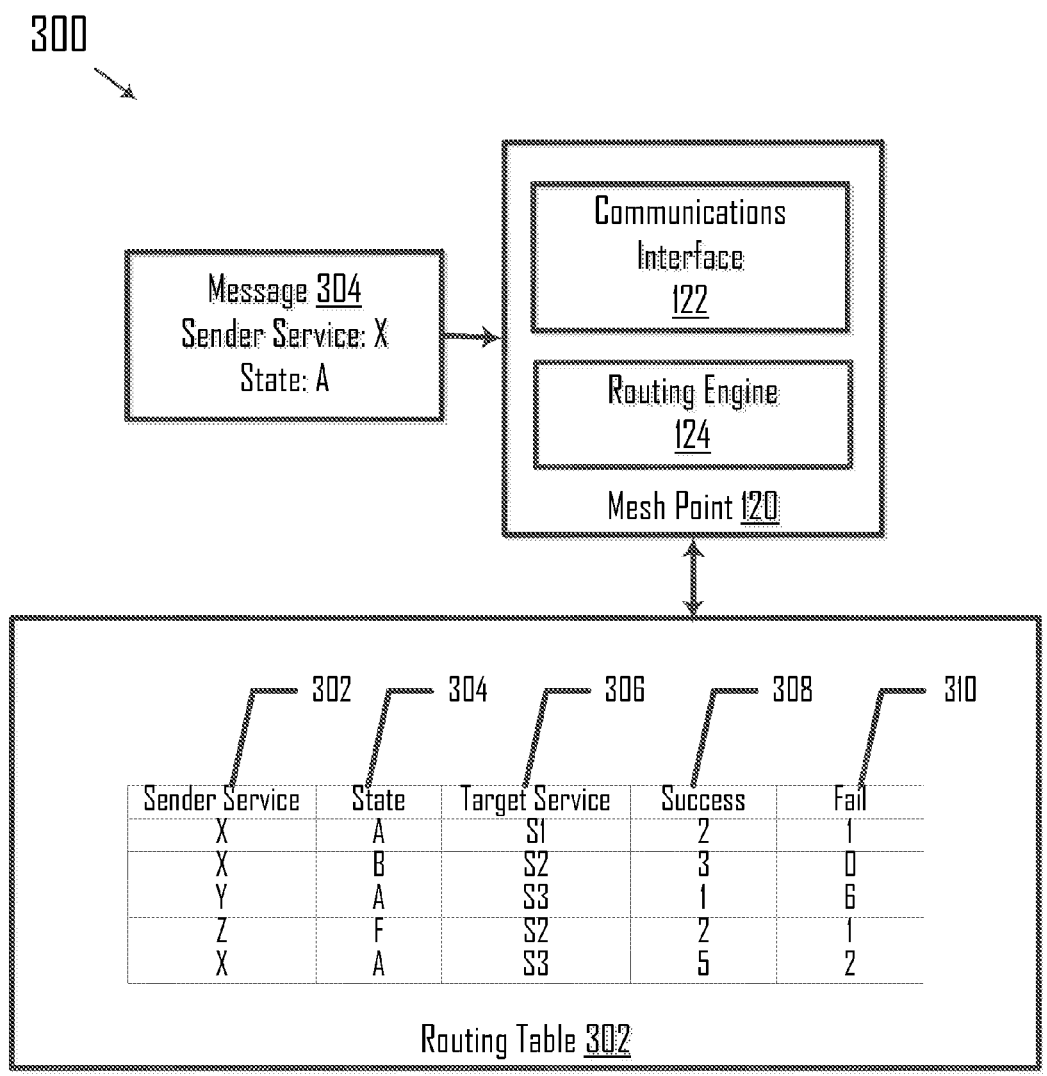
FIG. 3 is a diagram of a routing table that is accessed by a mesh point, according to an embodiment.

FIG. 3 is a diagram 300 of a routing table 302 that is accessed by mesh point 120, according to an embodiment. Routing table 302 includes columns "Sender Service" 302, "State" 304, "Target Service" 306, "Success" 308, and "Fail" 310. In an embodiment, routing engine 124 implements the routine illustrated in Table E.

Communications interface 122 may receive a message 304 that includes a sender service identifier "X" that identifies X as the sender service and a state A. In an embodiment, routing engine 124 determines, based on routing table 302, whether mesh point 120 has received any previous messages from sender service "X" indicated in received message 304. When routing engine 124 determines that mesh point 120 has previously received a message from sender service "X", routing engine 124 identifies one or more candidate rows in routing table 302, where each candidate row of the one or more candidate rows includes the sender service identifier and state included in message 304. It should be understood that the state field in the message is optional. Routing engine 124 may then select the target service from the one or more candidate rows and route message 304 to the selected target service in the dynamic service mesh.

As illustrated at lines 1-4 of Table E, routing engine 124 may select candidate rows 1 and 5 from routing table 302, where rows 1 and 5 include sender service X and state A and create an associative array "P". For each target service in a candidate row, the associative array stores a difference between the success count and fail count of the particular sender service. Candidate row 1 of routing table 302 includes a sender service X, state A, target service S1, success count=2, and fail count=1. Candidate row 5 of routing table 302 includes a sender service X, state A, target service S3, success count=5, and fail count=2. In such an example, P[target service S1]=1 (e.g., success count=fail count=2−1=1) and P[target service S3]=3 (e.g., success count=fail count=5−2=3). Further and as illustrated at lines 5-8 of Table E, routing engine 124 determines that 1 is the min variable of all values in associative array P (e.g., minimum P (P[target service S1]=1, P[target service S3]=3)) and increments the min variable by 1 such that it is now 2. Routing engine 124 increments all values in the associated array P by the min variable such that P[target service S1]=3 (e.g., 1+2) and P[target service S3]=5 (e.g., 3+2) and determines a sum equal to all values in the associative array P, where the sum=8 (e.g., P[target service S1]=3+P[target service S3]=5).

Further and as illustrated at lines 9-17 of Table E, routing engine 262 may generate a random number and if the randomly generated number is not less than or equal to 10 and routing table 242 is not empty, routing engine 262 may calculate a probability for each of the sender services in the associated array P to determine which sender service to send the message. Routing engine 124 may select a target service from the one or more candidate rows and route message 304 to the selected target service. For one or more target services included in the one or more identified candidate rows, routing engine 262 may determine a probability that the respective target service will accept message 304 and may select a target service based on one or more of the determined probabilities.

In an example, routing engine 124 generates random number 60 and for each target service of the one or more candidate rows, determines a probability that the respective target service will accept the message. As illustrated at line 17 of Table E, routing engine 262 determines that probability of P[target service S1]/sum=⅜ and that probability of P[target service S3]/sum=⅝. Routing engine 124 may select the target service with the higher probability. In such an example, routing engine 124 may select S3 as the target service.

As discussed above and further emphasized here, FIGS. 1-3 are merely examples, which should not unduly limit the scope of the claims. For example, it should be understood that one or more modules (e.g., communications interface 122 and routing engine 124) may be combined with another module. It should also be understood that a module may be separated into more than one module. In an example, routing engine 124 is split into a first routing engine and a second routing engine.

IV. Example Method

Figure 4:
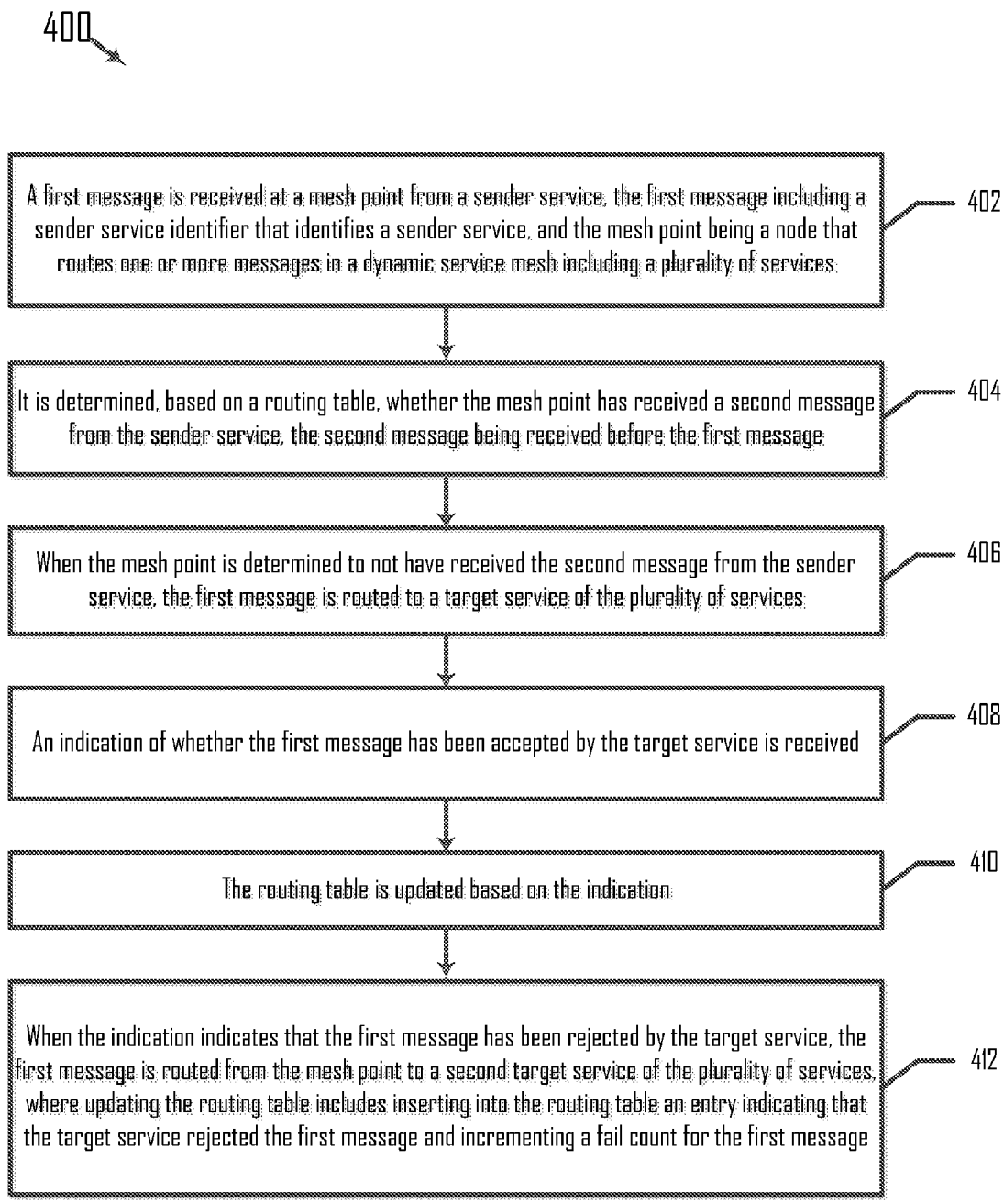
FIG. 4 is a flowchart illustrating a method of routing a message in a dynamic service mesh including a plurality of services, according to an embodiment.

FIG. 4 is a flowchart illustrating a method 400 of routing a message in a dynamic service mesh including a plurality of services, according to an embodiment. Method 400 is not meant to be limiting and may be used in other applications.

In FIG. 4, method 400 includes blocks 402-412. In a block 402, a first message is received at a mesh point from a sender service, the first message including a sender service identifier that identifies a sender service, and the mesh point being a node that routes one or more messages in a dynamic service mesh including a plurality of services. In an example, communications interface 122 receives at mesh point 120 a first message from a sender service, the first message including a sender service identifier that identifies a sender service, and mesh point 120 being a node that routes one or more messages in dynamic service mesh 110 including a plurality of services. In a block 404, it is determined, based on a routing table, whether the mesh point has received a second message from the sender service, the second message being received before the first message. In an example, routing engine 124 determines, based on routing table 126, whether mesh point 120 has received a second message from the sender service, the second message being received before the first message.

In a block 406, when the mesh point is determined to not have received the second message from the sender service, the first message is routed to a target service of the plurality of services. In an example, when mesh point 120 is determined to not have received the second message from the sender service, routing engine 124 routes the first message to a target service of the plurality of services.

In a block 408, an indication of whether the first message has been accepted by the target service is received. In an example, communications interface 122 receives an indication of whether the first message has been accepted by the target service. In a block 410, the routing table is updated based on the indication. In an example, routing engine 124 updates routing table 126 based on the indication. In a block 412, when the indication indicates that the first message has been rejected by the target service, the first message is routed from the mesh point to a second target service of the plurality of services, where updating the routing table includes inserting into the routing table an entry indicating that the target service rejected the first message and incrementing a fail count for the first message. In an example, when the indication indicates that the first message has been rejected by the target service, routing engine 124 routes the first message from mesh point 120 to a second target service of the plurality of services, where updating routing table 126 includes inserting into routing table 126 an entry indicating that the target service rejected the first message and incrementing a fail count for the first message.

It is also understood that additional processes may be inserted before, during, or after blocks 410-412 discussed above. It is also understood that one or more of the blocks of method 400 described herein may be omitted, combined, or performed in a different sequence as desired.

V. Example Computing System

Figure 5:
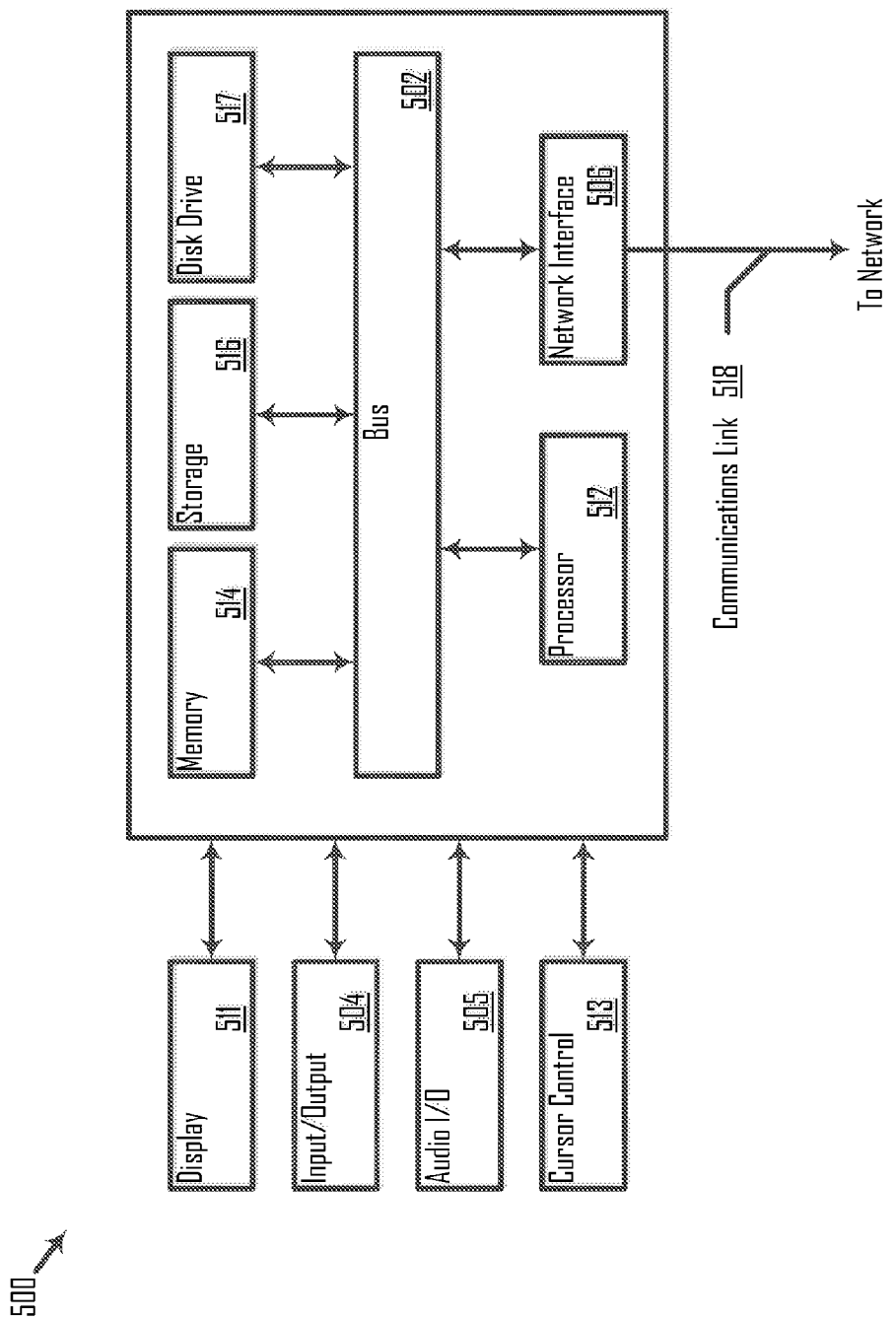
FIG. 5 is a block diagram of an electronic system suitable for implementing one or more embodiments of the present disclosure.

FIG. 5 is a block diagram of a computer system 500 suitable for implementing one or more embodiments of the present disclosure. In various implementations, the mesh points may execute on a computing device including one or more processors. The computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (e.g., network 102).

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices via a communication link 518 to a network. In an embodiment, the transmission is wireless, although other transmission mediums and methods may also be suitable. A processor 512, which may be a micro-controller, digital signal processor (DSP), or other processing component, processes these various signals, such as for display on computer system 500 or transmission to other devices via communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of routing a message in a dynamic service mesh including a plurality of services, comprising:
   receiving at a mesh point a first message from a sender service, the first message including a sender service identifier that identifies a sender service, and the mesh point being a node that routes one or more messages in a dynamic service mesh including a plurality of services;
   determining, based on a routing table, whether the mesh point has received a second message from the sender service, the second message being received before the first message;
   in response to a determination that the mesh point has not received the second message from the sender service, routing the first message to a target service of the plurality of services;
   receiving an indication of whether the first message has been accepted by the target service;
   updating the routing table based on the indication; and
   in response to a determination that the indication indicates that the first message has been rejected by the target service, routing the first message from the mesh point to a second target service of the plurality of services, wherein the updating includes inserting into the routing table an entry indicating that the target service rejected the first message and incrementing a fail count for the first message.

2. The method of claim 1, further including:
   in response to a determination that the indication indicates that the first message has been accepted by the target service, the updating includes inserting into the routing table an entry indicating that the target service accepted the first message and incrementing a success count for the first message.

3. The method of claim 2, further including:
   in response to a determination that the indication indicates that the first message has been rejected by the target service, the receiving an indication includes receiving at the mesh point the first message from the target service.

4. The method of claim 3, further including:
   in response to a determination that the mesh point has received the second message from the sender service:
      identifying one or more candidate rows in the routing table, each candidate row of the one or more candidate rows including the sender service identifier included in the first message;
      selecting the target service from the one or more candidate rows; and
      routing the first message to the target service of the plurality of services.

5. The method of claim 4, wherein the first message includes a state, and wherein each candidate row of the one or more candidate rows includes the state.

6. The method of claim 4, further including:
in response to a determination that the mesh point has received the second message from the sender service for one or more target services included in the one or more identified candidate rows, determining a probability that the respective target service will accept the first message, wherein the selecting includes selecting the target service based on the one or more determined probabilities.

7. The method of claim 6, wherein in response to a determination that the mesh point has not received the second message from the sender service, the selecting includes randomly selecting the target service.

8. The method of claim 7, further including:
generating a random number;
determining whether the random number satisfies a threshold; and
in response to a determination that the random number satisfies the threshold or that the mesh point has not received the second message from the sender service, the selecting includes randomly selecting a target service of the plurality of services.

9. The method of claim 4, further including:
in response to a determination that the mesh point has received the second message from the sender service:
for each target service of the one or more identified candidate rows, calculating a difference between the success count and the fail count in the respective candidate row;
identifying a minimum value of the one or more calculated differences;
incrementing the minimum value by one;
for each target service of the one or more candidate rows, determining a new value, wherein the determining a new value includes incrementing the respective calculated difference by the incremented minimum value;
determining a sum of the one or more new values; and
for each target service of the one or more identified candidate rows, determining a probability that the respective target service will accept the message.

10. The method of claim 9, wherein the determining a probability includes dividing the respective new value by the sum, and wherein the selecting includes selecting the target service based on the one or more respective probabilities.

11. The method of claim 10, wherein the selecting the target service based on the one or more respective probabilities includes selecting the target service of the one or more identified candidate rows having a highest probability of the one or more probabilities.

12. The method of claim 11, further including:
generating a random number;
determining whether the random number satisfies a threshold; and
in response to a determination that the random number satisfies the threshold or that the mesh point has not received the second message from the sender service, the selecting includes randomly selecting a target service of the plurality of services.

13. The method of claim 12, further including:
in response to a determination that the random number does not satisfy the threshold and that the mesh point has received the second message from the sender service, the selecting includes selecting the target service of the one or more identified candidate rows having a highest probability of the one or more probabilities.

14. The method of claim 9, wherein the first message includes a state, and wherein each candidate row of the one or more candidate rows includes the state.

15. A system for routing a message in a dynamic service mesh including a plurality of services, comprising:
a communications interface that receives a first message from a sender service and receives an indication of whether the first message has been accepted by a target service, wherein the first message includes a sender service identifier that identifies a sender service; and
a routing engine that determines, based on a routing table, whether a mesh point has received a second message from the sender service and updates the routing table based on the indication, wherein the second message is received before the first message and the mesh point is a node that routes one or more messages in a dynamic service mesh including a plurality of services,
wherein in response to a determination that the mesh point has not have received the second message from the sender service, the routing engine routes the first message to the target service of the plurality of services, and wherein in response to a determination that the indication indicates that the first message has been rejected by the target service, the routing engine routes the first message from the mesh point to a second target service of the plurality of services, inserts into the routing table an entry indicating that the target service rejected the first message, and increments a fail count for the first message.

16. The system of claim 15, wherein in response to a determination that the indication indicates that the first message has been accepted by the target service, the routing engine inserts into the routing table an entry indicating that the target service accepted the first message and increments a success count for the first message.

17. The system of claim 15, wherein in response to a determination that the indication indicates that the first message has been rejected by the target service, the communications interface receives the first message from the target service.

18. The system of claim 15, wherein in response to a determination that the mesh point is determined to have received the second message from the sender service, the routing engine identifies one or more candidate rows in the routing table, selects the target service from the one or more candidate rows, and routes the first message to the target service of the plurality of services, wherein each candidate row of the one or more candidate rows includes the sender service identifier included in the first message.

19. The system of claim 18, wherein in response to a determination that the mesh point is determined to have received the second message from the sender service for one or more target services included in the one or more identified candidate rows, the routing engine determines a probability that the respective target service will accept the first message and selects the target service based on the one or more determined probabilities.

20. A non-transitory machine-readable medium comprising a plurality of machine-readable instructions that when executed by one or more processors is adapted to cause the one or more processors to perform a method comprising:
receiving at a mesh point a first message from a sender service, the first message including a sender service identifier that identifies a sender service, and the mesh point being a node that routes one or more messages in a dynamic service mesh including a plurality of services;

determining, based on a routing table, whether the mesh point has received a second message from the sender service, the second message being received before the first message;

in response to a determination that the mesh point has not received the second message from the sender service, routing the first message to a target service of the plurality of services;

receiving an indication of whether the first message has been accepted by the target service;

updating the routing table based on the indication; and in response to a determination that the indication indicates that the first message has been rejected by the target service, routing the first message from the mesh point to a second target service of the plurality of services, wherein the updating includes inserting into the routing table an entry indicating that the target service rejected the first message and incrementing a fail count for the first message.

* * * * *